(12) United States Patent
Yoshida

(10) Patent No.: US 8,459,063 B2
(45) Date of Patent: Jun. 11, 2013

(54) BURNER FOR PRODUCING POROUS GLASS PREFORM

(75) Inventor: Makoto Yoshida, Kamisu (JP)

(73) Assignee: Shin-Etsu Chemical Co., Ltd. (JP)

( * ) Notice: Subject to any disclaimer, the term of this patent is extended or adjusted under 35 U.S.C. 154(b) by 235 days.

(21) Appl. No.: 13/092,311

(22) Filed: Apr. 22, 2011

(65) Prior Publication Data

US 2011/0259055 A1 Oct. 27, 2011

(30) Foreign Application Priority Data

Apr. 23, 2010 (JP) .................................. 2010-100092

(51) Int. Cl.
*C03B 37/018* (2006.01)

(52) U.S. Cl.
USPC .................... 65/531; 65/421; 65/413; 65/414

(58) Field of Classification Search
None
See application file for complete search history.

(56) References Cited

U.S. PATENT DOCUMENTS

| 4,810,189 A | 3/1989 | Mikami et al. | |
|---|---|---|---|
| 2004/0107883 A1* | 6/2004 | Cabrera-Llanos et al. | 110/261 |
| 2010/0323311 A1* | 12/2010 | Yoshida | 431/187 |

FOREIGN PATENT DOCUMENTS

| EP | 2098488 A1 | 9/2009 |
|---|---|---|
| EP | 2248775 A1 | 11/2010 |
| JP | 62187135 A | 8/1987 |
| JP | 05323130 | 12/1993 |
| JP | 7187683 A | 7/1995 |
| JP | 10101343 A | 4/1998 |
| JP | 10167748 A | 6/1998 |
| JP | 2000109328 A | 4/2000 |
| JP | 2002167223 A | 6/2002 |
| JP | 2003165737 A | 6/2003 |
| JP | 2003206154 A | 7/2003 |

(Continued)

OTHER PUBLICATIONS

Extended European Search Report for Application No. EP11163597 dated Apr. 2, 2012.

*Primary Examiner* — Christina Johnson
*Assistant Examiner* — Lisa Herring
(74) *Attorney, Agent, or Firm* — Lerner, David, Littenberg, Krumholz & Mentlik, LLP

(57) ABSTRACT

A multi-nozzle type burner is used for producing a porous glass preform, the burner having small variations in deposition efficiency with the burner tip being not burned even when axial shift occurs at the concentric multi-tube part of the burner. The present invention provides a burner for producing a porous glass preform with a concentric multi-tube structure, comprising a glass material gas jet port in a center, a plurality of gas jet ports concentrically disposed outside the glass material gas jet port, and small-diameter gas jet ports which are disposed in a line or a plurality of lines concentrically to the glass material gas jet port so as to be enclosed in one of the gas jet ports other than the gas jet ports in the center and at an outermost side, the small-diameter gas jet ports in the same line having an identical focal length. In the present invention, the gas jet ports disposed outside the gas jet port enclosing the small-diameter gas jet ports are each reduced in diameter in a direction toward a burner tip, and satisfy a relationship of $L1>L2>L3> \ldots >Ln$, where $L1, L2, L3, \ldots Ln$ represent lengths from the burner tip to diameter-reduction start positions of the outside-disposed gas jet ports in this order from the inside, respectively, so that the more outward the gas jet port is located, the closer to the burner tip the diameter-reduction start position of the gas jet port is.

2 Claims, 3 Drawing Sheets

FOREIGN PATENT DOCUMENTS

| | | | |
|---|---|---|---|
| JP | 2003212555 A | | 7/2003 |
| JP | 2003226544 A | | 8/2003 |
| JP | 2004269334 A | * | 9/2004 |
| JP | 2004331440 A | | 11/2004 |
| JP | 2006182624 A | | 7/2006 |
| WO | 2009107392 A1 | | 9/2009 |

* cited by examiner

BURNER FOR PRODUCING POROUS GLASS PREFORM

CROSS-REFERENCE TO RELATED APPLICATIONS

The present application claims priority from Japanese Patent Application No. JP 2010-100092, filed in the Japanese Patent Office on Apr. 23, 2010, the disclosure of which is hereby incorporated herein by reference.

BACKGROUND OF THE INVENTION

1. Field of the Invention

The present invention relates to a burner for producing a porous glass preform, having a multi-nozzle type concentric multi-tube structure in which multiple gas jet ports are disposed concentrically.

2. Description of Related Art

Conventionally, various methods have been proposed to produce an optical fiber preform. Among them, the outside vapor deposition method (OVD method) is generally used since the refractive-index distribution of an optical fiber preform to be obtained can be set relatively freely, and moreover optical fiber preforms with large diameters can be mass-produced. The OVD method includes depositing and attaching glass particulates generated in a flame of a burner onto a rotating starting member by relatively reciprocating the burner or the starting member, so as to synthesize a glass particulate deposition (hereinafter, referred to as "soot"), and dehydrating and sintering the resultant soot in an electric furnace to produce a transparent glass body.

Conventionally, a concentric multi-tube burner has been used for synthesizing the soot. Such a structure of the burner does not allow glass material gas, combustible gas, and combustion-supporting gas to be mixed well, so that glass particulates are not produced sufficiently. As a result, the yield of the glass particulates is not satisfactory, thereby causing difficulties in synthesizing them at high speed.

To solve the above problem, Japanese Patent (JP-B) No. 1773359 proposes a multi-nozzle type burner in which small-diameter combustion-supporting gas jet ports are disposed in a combustible gas jet port to surround a material gas jet port arranged in a center of the burner.

Moreover, the following methods have been proposed to further improve deposition efficiency with this type of burner.

Japanese Patent Application Publication (JP-A) No. 2003-206154, JP-A No. 2004-331440, JP-A No. 2006-182624, and JP-B No. 3744350, for example, propose configurations of the small-diameter combustion-supporting gas jet ports. Meanwhile, JP-A No. Hei 05-323130, JP-B No. 3543537, and JP-A No. 2003-226544, for example, propose optimization of focal lengths of the small-diameter combustion-supporting gas jet ports. In addition, Japanese Patent No. 3591330, JP-A No. 2003-165737, JP-A No. 2003-212555, and Japanese Patent No. 3653902, for example, propose optimization of a gas flow rate and a gas linear velocity.

The burner for producing a porous glass preform is generally made of silica glass to prevent contamination, and is manually fabricated by a glass blower. In particular, the multi-nozzle type burner has a more complex structure than a conventional concentric multi-tube burner and, specifically, it is highly difficult to fabricate the multi-nozzle type burner having a configuration in which multiple gas jet ports are arranged outside the small-diameter gas jet port and are reduced in their diameters at the tip side.

Therefore, although the multi-nozzle type burner having such a complex structure is fabricated by a skilled glass blower with satisfactory attention to precision, individual differences of the burners tend to be larger than a conventional concentric multi-tube burner. Such individual differences of the burners result from tolerance stack-up of members.

The individual differences disadvantageously cause variations in deposition efficiency even under the same deposition conditions or result in damage of the burner tip by being burned.

BRIEF SUMMARY OF THE INVENTION

An object of the invention is to provide a multi-nozzle type burner for producing a porous glass preform, the burner having small variations in deposition efficiency with the burner tip being not burned even when axial shift occurs at the concentric multi-tube part of the burner.

The present invention has been made to achieve the above-described object, and a burner for producing a porous glass preform with a concentric multi-tube structure includes a glass material gas jet port in a center; a plurality of gas jet ports concentrically disposed outside the glass material gas jet port; and small-diameter gas jet ports which are disposed in a line or a plurality of lines concentrically to the glass material gas jet port so as to be enclosed in one of the gas jet ports other than the gas jet ports in the center and at an outermost side, the small-diameter gas jet ports in the same line having an identical focal length. In the burner, the gas jet ports disposed outside the gas jet port enclosing the small-diameter gas jet ports are each reduced in diameter in a direction toward a burner tip, and satisfy a relationship of $L1>L2>L3> \ldots >Ln$, where $L1, L2, L3, \ldots Ln$ represent lengths from the burner tip to diameter-reduction start positions of the outside-disposed gas jet ports in this order from the inside, respectively, so that the more outward the gas jet port is located, the closer to the burner tip the diameter-reduction start position of the gas jet port is.

Meanwhile, a method for producing a porous glass preform is a production method using the burner for producing a porous glass preform.

In the burner having the configuration described above, the tubes are reduced in diameter toward the tip sequentially from the inside to the outside, so that the diameter-reduction start positions are shifted sequentially, thereby preventing clearance of a gas flow path from being extremely small.

DETAILED DESCRIPTION

Figure 1:
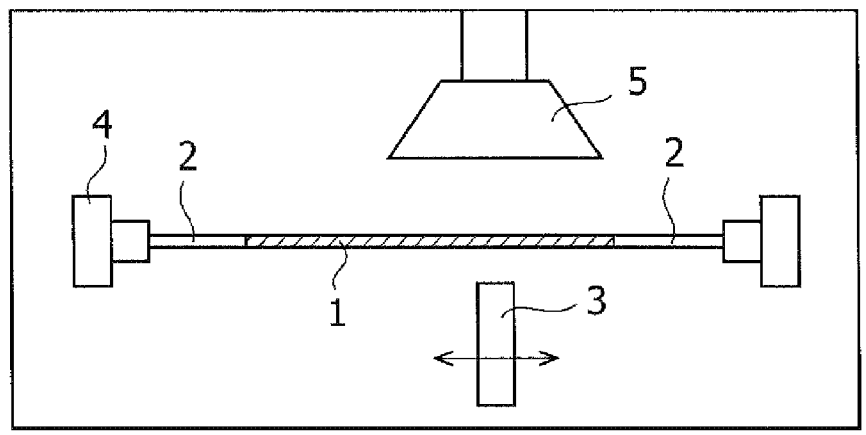
FIG. 1 is a schematic diagram exemplifying an apparatus for producing an optical fiber preform.

As a result of intensive research, as for a multi-nozzle type burner in which multiple gas jet ports are arranged outside small-diameter gas jet ports and are reduced in their diameters at the tips, it was found that individual differences of the burners are highly influenced by the linear velocity distribution at outlets of the gas jet ports arranged outside the small-diameter gas jet ports.

In other words, when the linear velocity distribution varies greatly at an inert gas jet port arranged outside the small-diameter gas jet ports, inert gas cannot flow sufficiently to the part in which the linear velocity is low, thereby preventing combustible gas and combustion-supporting gas from being sealed completely. Accordingly, the burner tips at the part in which the linear velocity is low are burned to provide the burner susceptible to denitrification.

Meanwhile, when the linear velocity distribution varies greatly at a jet port for combustible gas or combustion-supporting gas arranged outside the small-diameter gas jet ports, nonuniformity in gas reaction is induced, by which deposition efficiency is decreased and a flame does not come into contact with the deposition surface perpendicularly since the flame is bent. Therefore, a burner with low deposition efficiency is provided.

The nonuniformity in linear velocity distribution is caused by variations in clearance of a gas flow path due to the axial shift between the tubes of the jet ports. A large amount of gas flows through the part in which clearance is large, whereas gas is not likely to flow through the part in which clearance is small. Much effort, of course, is made by a glass blower to prevent the axial shift, but it is extremely difficult to make the axial shift amount zero.

Table 1 shows a clearance comparison between cases of large clearance and small clearance, where the inner tubes are the same, and the outer tube axial shift amounts are commonly 0.5 mm. Even with the same axial shift amount, a smaller absolute amount of clearance results in a larger clearance ratio (b/a), whereas a larger absolute amount of clearance results in a smaller clearance ratio (b/a), thereby allowing influence of the axial shift to be reduced relatively. As a result, a smaller absolute amount of clearance leads to great varieties in linear velocity distribution.

TABLE 1

|  |  | Small clearance | Large clearance |
|---|---|---|---|
| Inner tube diameter | mm | 30 | 30 |
| Outer tube diameter | mm | 32 | 38 |
| Average clearance | mm | 1.0 | 4.0 |
| Minimum clearance (a) | mm | 0.5 | 3.5 |
| Minimum clearance (b) | mm | 1.5 | 4.5 |
| Clearance ration | — | 3 | 1.3 |

Accordingly, to reduce individual differences of the burners, i.e. to reduce the variation in linear velocity distribution, it is important not only to avoid setting a predetermined clearance at too small a value when the burner is designed. However, it is more important to prevent clearance from unexpectedly being extremely small at a certain part in a longitudinal direction.

Here, as for the burner in which multiple gas jet ports are arranged outside small-diameter gas jet ports and are reduced in diameter at the tips, it was found that variations in diameter-reduction start position result in a smaller absolute amount of clearance than the designed clearance at the diameter-reduced part, so that linear velocity distribution tends to vary greatly.

Since a burner craftsman adjusts the tubes manually, it is extremely difficult to achieve completely the same positions of the diameter-reduced parts and completely the same shapes of the reduced diameters among burners.

In the part with smaller clearance, the diameter-reduction start position of the outer tube was, in fact, slightly further from the tip than that of the inner tube, although the diameter of each tube is supposed to be reduced at the same position. In such a case, the outer tube was reduced in diameter first to be close to the inner tube, thereby resulting in smaller clearance than the designed clearance.

In this respect, the present inventors have conducted diligent studies. As a result, the above problem of variation in clearance of a gas flow path, which arises during a process of reducing the diameter of the gas jet port, has been solved in the following manner. Specifically, when the gas jet ports disposed outside the gas jet port enclosing the small-diameter gas jet ports are each reduced in diameter in a direction toward a burner tip, a relationship of $L1>L2>L3 \ldots Ln$, where $L1$, $L2$, $L3$, ... $Ln$ represent lengths from the burner tip to diameter-reduction start positions of the outside-disposed gas jet ports in this order from the inside, respectively, so that the more outward the gas jet port is located, the closer to the burner tip the diameter-reduction start position of the gas jet port is.

Hereinafter, the embodiments of the present invention will be described in detail with reference to the accompanying drawings, but the present invention is not limited thereto.

In FIG. 1, a starting member is welded with dummy rods 2 at both ends of a core rod 1, and rotatably supported by a chuck mechanism 4 about an axis. A burner 3 is configured to laterally move, and is disposed to face the starting member. Optical fiber materials, e.g. vapor of $SiCl_4$ or the like and combustion gas (hydrogen gas and oxygen gas), are sprayed with the burner 3 to the starting member to deposit on the starting member glass particulates (soot) generated by hydrolysis in an oxyhydrogen flame. Then, a deposition layer is formed by reciprocating the burner 3 in the longitudinal direction of the starting member with a burner guide mechanism (not shown), thereby providing a porous glass preform for optical fiber. Now, although not shown, a mechanism may be employed in which the starting member is reciprocated in the longitudinal direction instead of the burner 3.

Thereafter, the porous glass preform for optical fiber is dehydrated in a heating furnace, and then converted to a transparent glass to be a glass preform for optical fiber.

EXAMPLES

Figure 2:
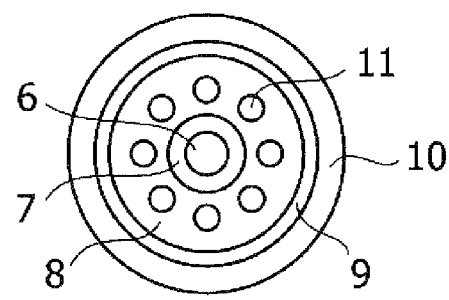
FIG. 2 is a cross-sectional view of a burner for synthesizing glass particulates, having small-diameter gas jet ports.
Figure 3:
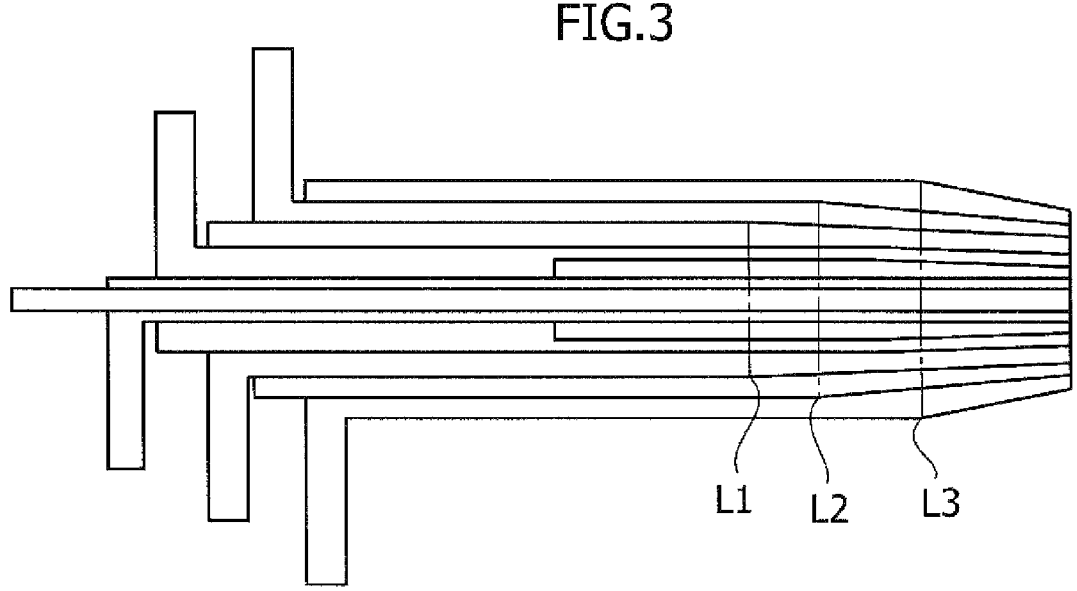
FIG. 3 is a schematic longitudinal sectional view exemplifying the burner for synthesizing glass particulates of the invention.

As shown in FIG. 2, a burner for producing a porous glass preform includes a first tube of a glass material gas jet port in a center, a second tube of a seal gas jet port, a third tube of a combustible gas jet port enclosing eight small-diameter combustion-supporting gas jet ports 11 having a focal length of 150 mm, a fourth tube of a seal gas jet port, and a fifth tube of a combustion-supporting gas jet port. The tips of the third tube, the fourth tube, and the fifth tube are reduced in diameter as shown in FIG. 3. Intentionally, the fourth tube was axially shifted by 0.5 mm relative to the third tube, and the fifth tube was axially shifted by 0.5 mm relative to the fourth tube.

Figure 4:
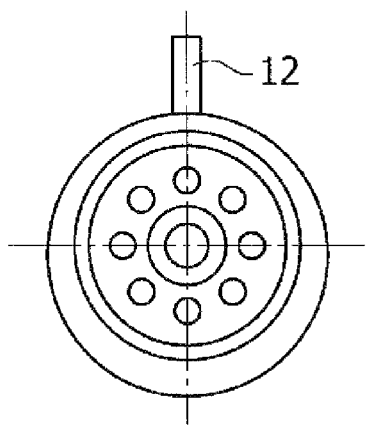
FIG. 4 is a schematic view illustrating the direction of the axial shift for the burner with its axis shifted used in Examples.

As shown in FIG. 4, the fourth and the fifth tubes were axially shifted in such a direction that the clearances can be smaller on a side in which the gas inlet tubes of the gas jet ports were disposed.

Prepared were burners that had such a structure in common and had only their diameter-reduction positions varied as shown in Table 2, and then the linear velocity distribution was measured at the burner tips with a hot-wire anemometer at room temperature.

Figure 5:
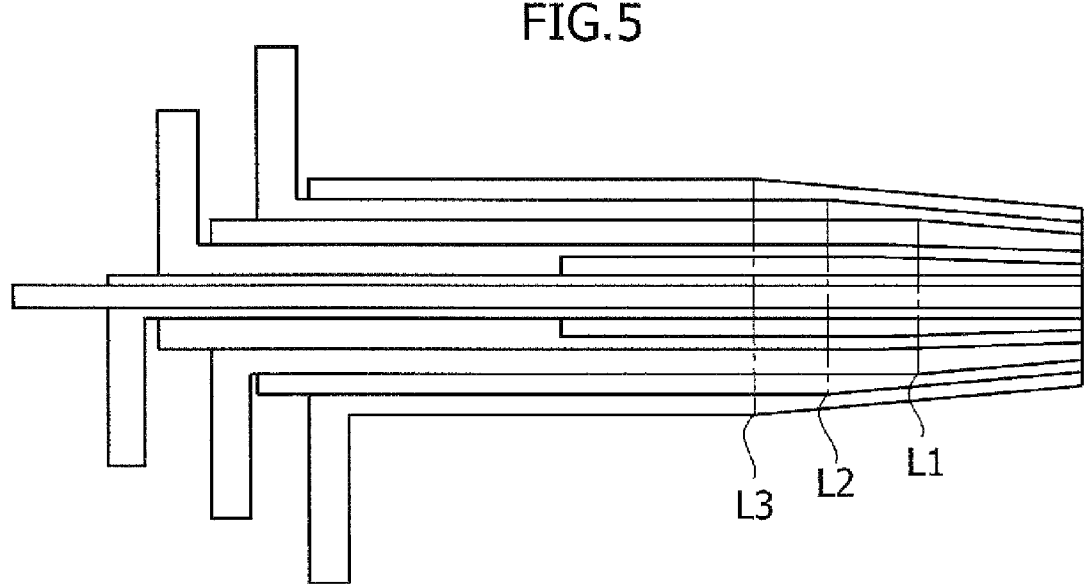
FIG. 5 is a schematic longitudinal sectional view exemplifying a burner for synthesizing glass particulates used in Comparative Examples.

The burner used in Examples 1 and 2, as shown in FIG. 3, has a structure in which a tube arranged more outward from the small-diameter gas jet ports 11 has a diameter reduced at a position closer to the burner tip (L1>L2>L3). On the other hand, the burner used in Comparative Examples 1 and 2, as shown in FIG. 5, has a structure in which a tube arranged more outward from the small-diameter gas jet ports 11 has a diameter reduced at a position more away from the burner tip (L1<L2<L3).

Regarding gases used, the fourth tube was supplied with $N_2$ as a seal gas at 5 L/min, and the fifth tube was supplied with $O_2$ as a combustion-supporting gas at 40 L/min.

TABLE 2

|  |  | Example 1 mm | Example 2 mm | Comparative Example 1 mm | Comparative Example 2 mm |
|---|---|---|---|---|---|
| Diameter-reduction position of third tube | L3 | 70 | 70 | 70 | 70 |
| Diameter-reduction position of fourth tube | L4 | 60 | 65 | 75 | 80 |
| diameter-reduction position of fifth tube | L5 | 50 | 60 | 80 | 90 |

Figure 6:
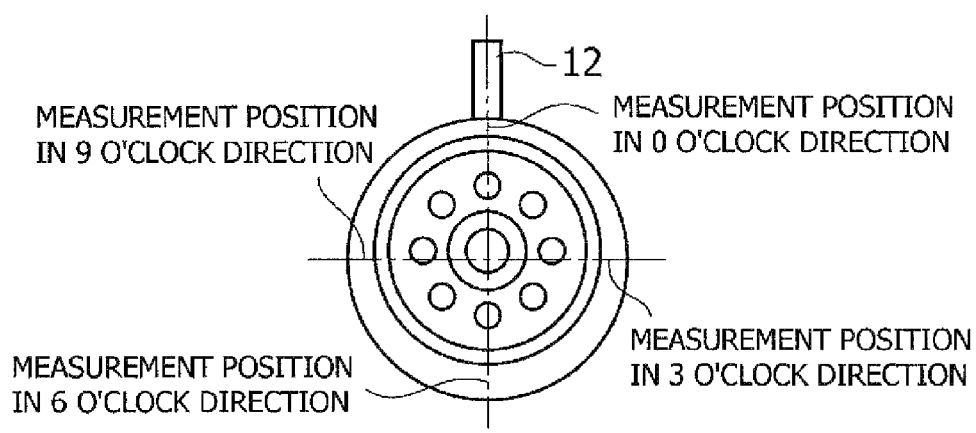
FIG. 6 is a schematic diagram illustrating the positions at which the linear velocity distribution of the burner is measured.

The linear velocity distribution was measured at 90 degree intervals in four directions, i.e. zero o'clock, three o'clock, six o'clock, and nine o'clock directions. Here, as shown in FIG. 6, the direction in which the gas inlet tubes of the gas jet ports are disposed is defined as the zero o'clock direction.

Figure 7:
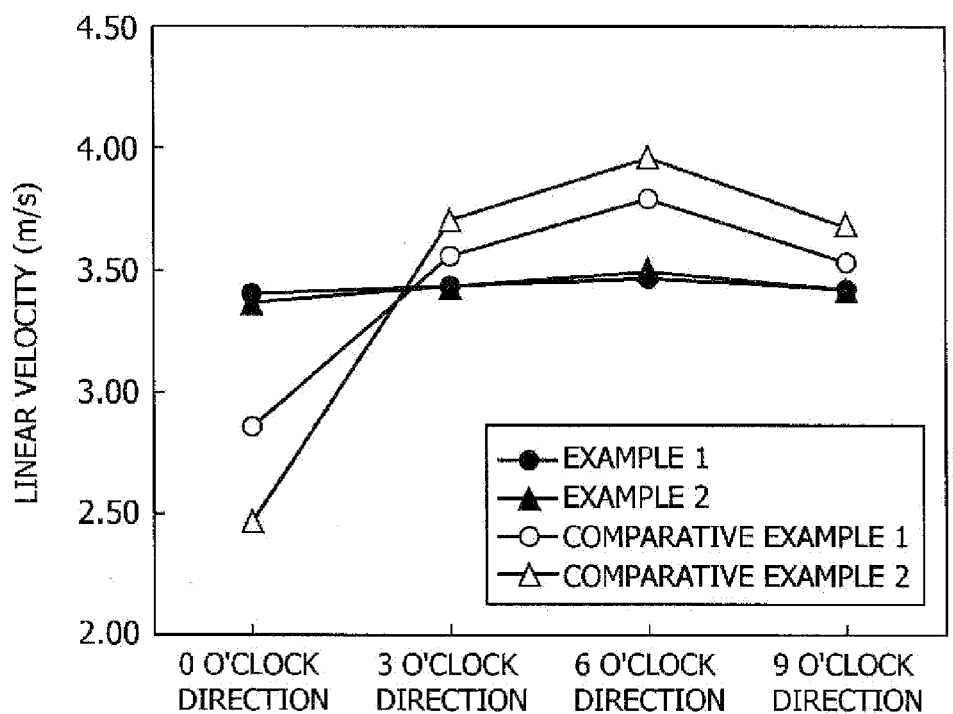
FIG. 7 is a graph showing the linear velocity distribution of a fourth tube.
Figure 8:
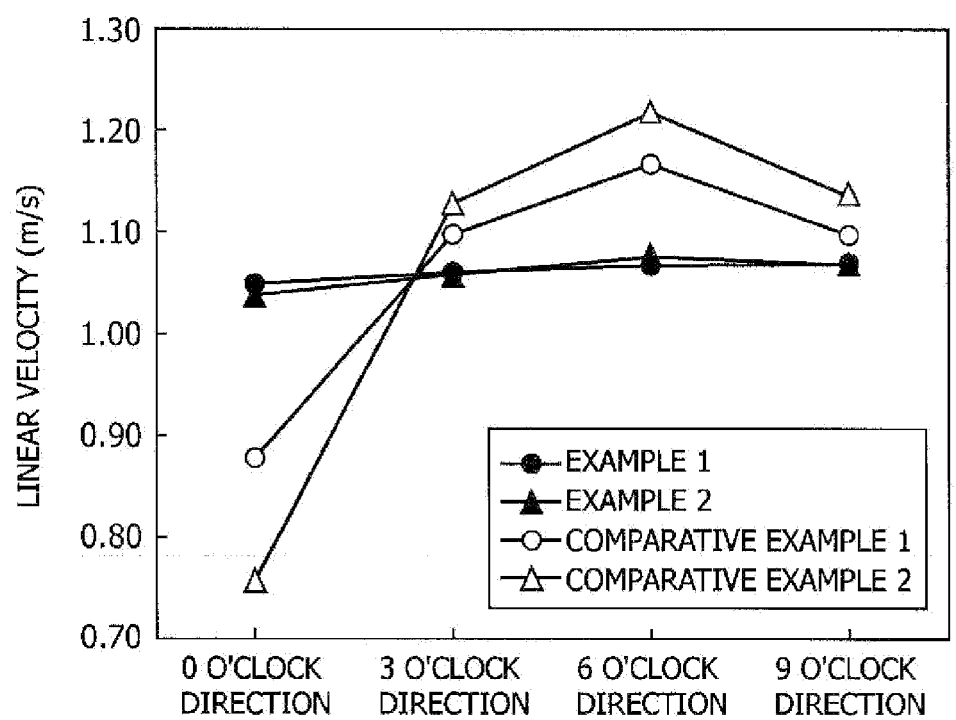
FIG. 8 is a graph showing the linear velocity distribution of a fifth tube.

As a result, in both of the linear velocity distribution measured at the outlet of the fourth tube shown in FIG. 7 and the linear velocity distribution measured at the outlet of the fifth tube shown in FIG. 8, the linear velocity greatly varied depending on the direction of measurement in the cases of the burners of Comparative Examples, whereas the linear velocity distribution hardly varied in the cases of the burners of Examples in which the more outward the tube was located, the closer to the burner tip the diameter-reduction start position of the tube was.

Next, by using each of the burners in Table 2, and by actually supplying a reaction gas, 100 kg of porous glass particulates were deposited on a starting member having a core rod (outer diameter: 40 mm, length: 2000 mm) and dummy rods (outer diameter: 40 mm) welded at the both ends of the core rod.

Regarding gases used, the first tubes was supplied with $SiCl_4$ as a glass material gas at 10 L/min and with $O_2$ as a combustion-supporting gas at 20 L/min, the second tube was supplied with $N_2$ as a seal gas at 4 L/min, the third tube was supplied with $H_2$ as a combustible gas at 170 L/min, the fourth tube was supplied with $N_2$ as a seal gas at 5 L/min, the fifth tube was supplied with $O_2$ as a combustion-supporting at 40 L/min, and the small-diameter gas jet ports were supplied with $O_2$ as a combustion-supporting gas at 16 L/min.

The result is shown in Table 3.

TABLE 3

|  | State of burner tip | Deposition efficiency (%) |
|---|---|---|
| Example 1 | No abnormality | 68.3 |
| Example 2 | No abnormality | 68.3 |
| Comparative Example 1 | Burned fourth tube tip | 67.6 |
| Comparative Example 2 | Burned fourth tube tip | 65.8 |

In Comparative Examples 1 and 2, the tip of the fourth tube in the 0 o'clock direction in which the linear velocity was low was heated red and burned. This was caused by insufficient sealing between a combustible gas in the third tube and a combustion-supporting gas in the fifth tube. In addition, since the combustion-supporting gas was less in the fifth tube in the 0 o'clock direction in which the linear velocity was low, a dark flame was observed at the part.

On the other hand, in Examples 1 and 2, a burned burner tip, an uneven flame, and the like were not observed.

As a result, Examples exhibited stable and high deposition efficiencies.

| Description of Reference Numerals | |
|---|---|
| 1. | core part |
| 2. | dummy rod |
| 3. | burner |
| 4. | ingot chuck mechanism |
| 5. | exhaust hood |
| 6. | glass material gas jet port (first tube) |
| 7. | seal gas jet port (second tube) |
| 8. | combustible gas jet port (third tube) |
| 9. | seal gas jet port (fourth tube) |
| 10. | combustion-supporting gas jet port (fifth tube) |
| 11. | small-diameter combustion-supporting gas jet port |
| 12. | gas inlet |
| L1. | diameter-reduction start position of third tube |
| L2. | diameter-reduction start position of fourth tube |
| L3. | diameter-reduction start position of fifth tube (outermost tube) |

The invention claimed is:

1. A burner for producing a porous glass preform with a concentric multi-tube structure, comprising:
    a glass material gas jet port in a center;
    a plurality of gas jet ports concentrically disposed outside the glass material gas jet port; and
    small-diameter gas jet ports which are disposed in a line or a plurality of lines concentrically to the glass material gas jet port so as to be enclosed in one of the gas jet ports other than the gas jet ports in the center and at an outermost side, the small-diameter gas jet ports in the same line having an identical focal length,
    wherein the gas jet ports disposed outside the gas jet port enclosing the small-diameter gas jet ports are each reduced in diameter in a direction toward a burner tip, and satisfy a relationship of L1>L2>L3> . . . >Ln, where L1, L2, L3, . . . Ln represent lengths from the burner tip to diameter-reduction start positions of the outside-disposed gas jet ports in this order from the inside, respectively, so that the more outward the gas jet port is located, the closer to the burner tip the diameter-reduction start position of the gas jet port is.

2. A method for producing a porous glass preform by using a burner with a concentric multi-tube structure comprising:
supplying reactant gases to the burner,
generating glass particulates by hydrolysis of the reactant gases in an oxyhydrogen flame, and
depositing the glass particulates towards a starting member,
wherein the burner comprises:
a glass material gas jet port in a center;
a plurality of gas jet ports concentrically disposed outside the glass material gas jet port; and
small-diameter gas jet ports which are disposed in a line or a plurality of lines concentrically to the glass material gas jet port so as to be enclosed in one of the gas jet ports other than the gas jet ports in the center and at an outermost side, the small-diameter gas jet ports in the same line having an identical focal length,
wherein the gas jet ports disposed outside the gas jet port enclosing the small-diameter gas jet ports are each reduced in diameter in a direction toward a burner tip, and satisfy a relationship of $L1>L2>L3> \ldots >Ln$, where $L1, L2, L3, \ldots Ln$ represent lengths from the burner tip to diameter-reduction start positions of the outside-disposed gas jet ports in this order from the inside, respectively, so that the more outward the gas jet port is located, the closer to the burner tip the diameter-reduction start position of the gas jet port is.

* * * * *